April 18, 1933.  P. W. KANE  1,904,372
PNEUMATIC SHOCK ABSORBER
Filed April 3, 1931    2 Sheets-Sheet 2
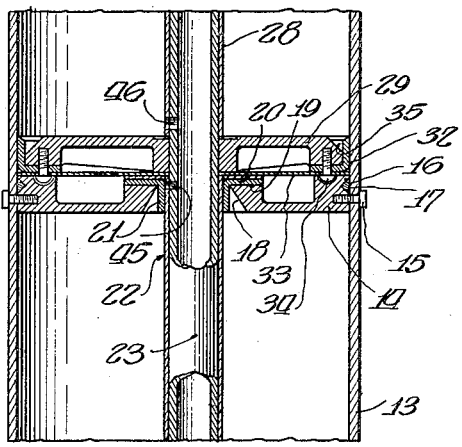
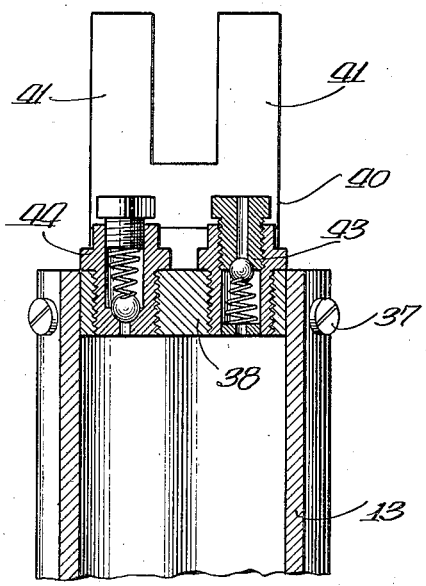
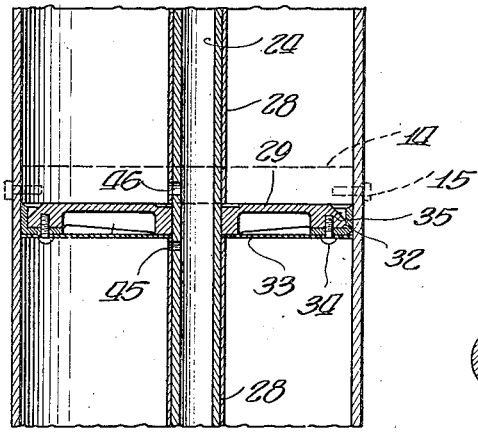
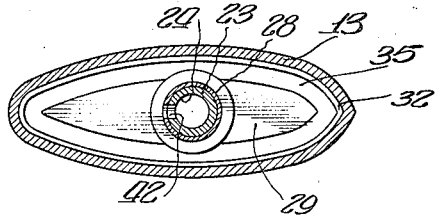
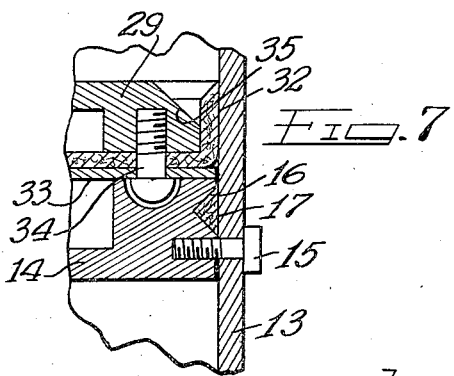
Inventor:
Peter W. Kane.

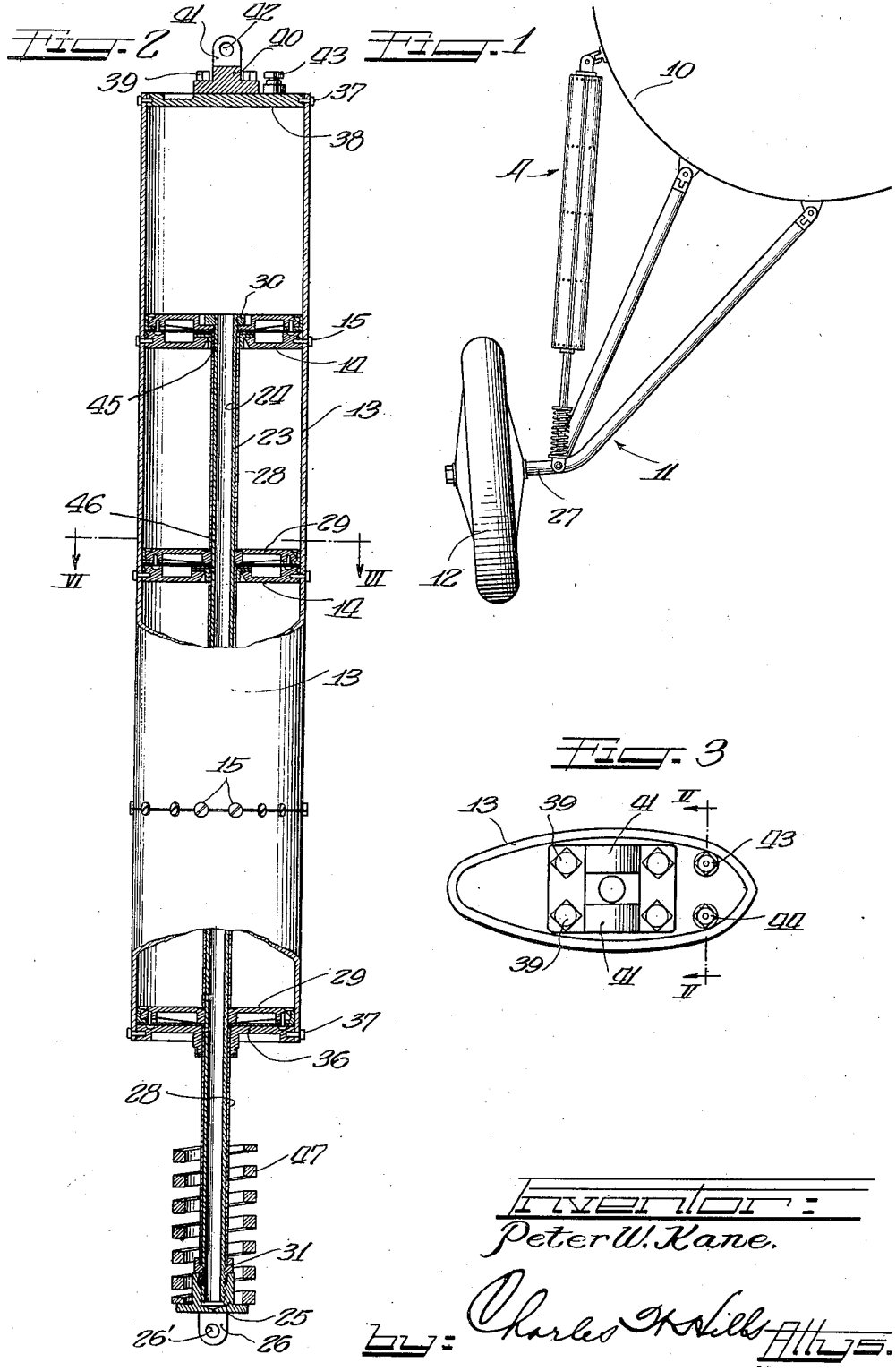

Patented Apr. 18, 1933

1,904,372

UNITED STATES PATENT OFFICE

PETER W. KANE, OF BUFFALO, NEW YORK

PNEUMATIC SHOCK ABSORBER

Application filed April 3, 1931. Serial No. 527,499.

This invention relates in general to shock absorbers of the pneumatic type such as used for the landing gear of aeroplanes, and more specifically concerns improvements in the shock absorber disclosed in my copending application filed May 5, 1930, Serial No. 449,953.

In general, my copending application discloses a pneumatic shock absorber which comprises a plurality of cylinders, of substantially uniform length, connected in end to end relationship to form an elongated casing of circular cross section. The top end of each cylinder terminates in an integrally formed head which serves as a partition member. Each of these members is provided with a stuffing box for receiving therethrough a piston rod which is common to all the cylinders. This piston rod has secured thereto a plurality of pistons, each piston being disposed within one of the cylinders. The lower end of each cylinder is provided with a relief valve for controlling the admission of air thereto, when the piston is moved upwardly.

In my present application, I propose to provide a continuous casing of streamline form, in order that as little resistance as possible will be offered to the movement of the aeroplane. Further, instead of having the partitions between the respective cylinders integrally formed with each cylinder, I propose to provide a plurality of partition members which are suitably spaced within the streamline casing and which are provided with peripheral seals of such nature that leakage between the cylinders will be prevented. The complicated stuffing box has been replaced by a simple cup leather of L-shaped cross section, which fits snugly around the common piston, and the relief valve in the bottom of each piston has been replaced by improved means for equalizing the pressures in the respective cylinders, the means also permitting air to enter below the pistons when they are being moved towards the upper ends of the cylinders.

Having in mind the above improvements, it is a primary object of my present invention to form the cylinder wall and the pistons operable therein in such a manner that a minimum of resistance will be offered to the movement of the aeroplane.

It is a further object of this invention to provide improved means for equalizing the pressures between the cylinders, both above and below the pistons.

It is a further object of this invention to provide improved means for separating the shock absorber into a plurality of cylinders in end to end relationship and preventing leakage between adjacent cylinders.

It is also an object of this invention to provide improved means for preventing leakage between the respective cylinders around the piston rod where it passes through the partition members between the cylinders.

The invention comprises the novel structure and combination of parts hereinafter described and more particularly pointed out and defined in the appended claims.

In the accompanying drawings which illustrate a preferred embodiment of this invention and in which simiuar reference numerals refer to similar features in the different views:

Figure 1 is a side view in elevation of a shock absorber embodying the principles of my invention, and showing its application to the landing gear of an aeroplane;

Figure 2 is a vertical view of my improved shock absorber with parts in section and with parts in elevation to show the details of construction;

Figure 3 is a plan view of the upper end of my improved shock absorber showing its general shape to secure a streamline effect;

Figure 4 is an enlarged fragmentary vertical section through its major horizontal axis to more clearly show the details of construction of the partitions separating the cylinders, and the pistons in the cylinders;

Figure 5 is an enlarged fragmentary sectional view through the upper end of the casing and the valves therein, taken substantially on line V—V of Figure 3;

Figure 6 is a horizontal cross section of my shock absorber, taken substantially on line VI—VI of Figure 2; and Figure 7 is an enlarged fragmentary sectional view showing more clearly the seal between the casing and the partitions therein.

As shown on the drawings:

As illustrative of my invention, there is shown in Figure 1 a shock absorber which is indicated in general by the letter A, connected between a body 10 of an aeroplane and a pivotal support 11 for a wheel 12 forming a part of the landing gear of the aeroplane.

The shock absorber A comprises an outer casing 13 in the form of an elongated tube of such shape as to present a streamline surface to the atmosphere, when mounted as disclosed in Figure 1.

The casing 13 is divided into a plurality of compression chambers by partition members 14 which are axially spaced apart and secured in position within the casing by suitable means such as screws 15 extending through the wall of the casing and into the periphery of the partition members.

In order to prevent leakage between the cylinders, each partition member 14 is provided with a V-shaped groove 16 in its periphery for receiving therein a V-shaped packing 17 which projects past the outer edges of this groove for engagement with the inner wall of the casing 13.

It will be observed that each partition member 14 is of streamline shape so as to conform to the shape of the casing 13. Each partition member is provided at its center with a downwardly flared aperture 18 having a seating surface 19 at its upper end for a leather washer 20. This washer is formed with a central depending portion 21 which extends into the aperture 18 and snugly engages the outer surface of a piston rod 22 extending longitudinally of the casing 13. In this arrangement, it will be observed that the free edge of the depending portion 21 is spaced from the wall of the aperture 18.

This piston rod consists of a tubular member 23 having a central core or passageway 24 extending throughout its length. The outer end of the member 23 is threaded into a member 25 which is formed with a pair of spaced lugs 26 having aligned apertures 26' to enable the making of a pivotal connection with the axle 27 of the landing gear of the aeroplane. A plurality of sleeves 28 are threaded on the rod 23, and between the adjacent ends of these sleeves is a piston 29 which is threaded on the tubular member 23. A clamping nut 30 threadedly engages the inner end of the tubular member 23, and a clamping member 31 threadedly engages the outer end of the tubular member 23. It is evident that the clamping nut 30 and the clamping member 31 provide means whereby the several sleeves and the pistons positioned between them are held clamped in spaced relation on the tubular member 23.

Each of the pistons 29 is of such shape that it conforms to the interior surface of the casing 13 and is provided with a suitable packing 32, which is shown as being a leather cup washer for preventing leakage of air past the piston during its upward or compression stroke. One of these leathers is secured to the under surface of each piston by means of a plate 33 having securing screws 34 which extend through the leather and threadedly engage the piston. The periphery of the leather is deflected upwardly so as to lie between and form a seal between the piston and the inner surface of the casing 13. The piston 29 is beveled at its periphery as shown at 35 so that as the pressure on the compression side of the piston is increased the leather will more forcibly be pushed against the wall of the casing, thereby enhancing its sealing effect.

The lower end of the casing 13 is closed by a header member 36. This member is secured to the casing in any suitable manner such as by screws 37 which extend through the casing and threadedly engage the peripheral portion of the header. At its center, the member 36 is formed to provide a bearing for the piston rod.

The upper end of the casing 13 is closed by a similar header 38, having secured to its upper surface as by means of bolts 39, a member 40 having a pair of spaced lugs 41—41 with aligned apertures 42 for pivotally connecting the upper end of the shock absorber to the body 10 of the aeroplane. A pair of oppositely opening valves 43 and 44 are mounted in the header 38, the valve 43 being of the outwardly seating type and the valve 44 of the inwardly seating type. Each of these valves is adjustable to open at different pressures, so that it is possible to regulate the pressure at which air may be expelled from the cylinders and the pressure at which air may be admitted to the cylinders.

Extending from the central passageway 24 of the tubular member 23, I prefer to provide a series of ports 45 and 46 which communicate with the suction side of the piston and the compression side of the piston respectively. For reasons which will subsequently appear, I have found it advantageous to make the ports 46 slightly larger than the ports 45.

Coiled around the outer end of the piston rod and supported by the member 25 is a coiled spring 47 which is of such length that its upper end will be spaced from the header 36 when the pistons are at the lower end of their stroke.

The operation of my improved shock absorber is as follows:

Assuming that the aeroplane is in the air, the landing gear will be in the position shown in Figure 1, that is, the pistons will be at the bottom of the cylinders and the valves 43 and 44 will be in closed position.

When the aeroplane lands, the pistons are forced upwardly against the air in the cylinders ahead of the pistons and against the downward pull of the vacuum behind the pistons. It will be observed that during this movement of the pistons the air between the various cylinders will be gradually equalized by virtue of the port connections 46 and the interconnecting passageway 24 in the tubular member 23. Also, that the vacuum formed behind the pistons will be gradually relieved by virtue of the smaller port connections 45 which are also in communication with the passageway 24. The valve 44 is suitably adjusted to hold the compressed air in the cylinders at such a pressure that the shocks of a normal landing or of the taxiing of the plane over the ground are taken care of by the resilient cushions of air ahead of the pistons. As the pistons are forced upwardly, a sufficient amount of air will have been drawn through the bleeder ports 45 to check the recoil of the landing gear. The size of these ports, however, is such that upon the initial sudden movement upwardly of the pistons, air is not admitted fast enough to immediately fill the space behind the piston, so that the pressure there is a vacuum for a brief period, yet fast enough to provide for an air cushion to check movement of the piston on the return or recoil stroke.

When the landing shock is unusually severe and the air ahead of the piston is momentarily compressed to an unusually high value, the valve 44 will open to allow air to escape until the air pressure falls to a desired value. In this event, the pistons will advance far enough to permit the upper end of the spring 47 to engage the header 36 and be compressed, thereby taking up the landing shock. Each piston at this time will approach a position relative to the partition member above it as shown in Figure 4, the partition member being shown in dotted lines. Immediately after the unusually severe shock has been taken care of by this spring, the piston rod will be urged outwardly by the spring so that there is an ample compression space ahead of the pistons to insure easy riding of the plane as it runs along the ground.

When the aeroplane takes off, the wheels of the landing gear will exert a downward force on the pistons and tend to move them downwardly to the lower portion of the cylinders. Obviously, downward movement of the pistons will cause a suction above the piston, and the intake valve 43 will open. At this time the air below the pistons will tend to be compressed, and in order that this compression of air shall not retard the downward movement of the pistons, the port openings 45 permit sufficient air to be exhausted. Thus, the component parts of the shock absorber and landing gear will assume their proper positions for taking up the shock when the aeroplane lands again.

My invention therefore provides an extremely efficient shock absorber having streamline cylinders and pistons; improved means for equalizing the pressures between the cylinders, both above and below the pistons; improved means for sealing the partitions disposed between the respective cylinders; and an improved but simple packing for the piston rod, wherein leakage therearound is substantially eliminated.

Now, it is of course to be understood that although I have described in detail the preferred embodiment of my invention, the invention is not to be thus limited but only insofar as defined by the scope and spirit of the appended claims.

I claim as my invention:

1. A shock absorber comprising a casing formed of a single length of tubing, partition members in said casing for forming a plurality of compression chambers, means extending between each of said partitions and said casing for sealing the compression chambers, a piston in each chamber, and a piston rod connecting said pistons for unitary movement.

2. A shock absorber comprising a casing formed of a single length of tubing, partition members in said casing for forming a plurality of compression chambers, each of said partition members having a peripheral groove, a member disposed in each of said grooves for engagement with the inner wall of said casing, whereby said compression chambers are sealed, a piston in each chamber, and means interconnecting said pistons for unitary movement.

3. A shock absorber comprising an elongated casing, a plurality of partition members dividing said casing into compression chambers, a piston rod extending through said members, a piston in each chamber secured to said piston rod, and a flexible member in engagement with said piston rod supported on each of said members, whereby leakage from one chamber to another along said piston rod is prevented.

4. A shock absorber comprising an elongated casing, a plurality of partition members dividing said casing into compression chambers, a piston rod extending through said members, a piston in each chamber secured to said piston rod, and a flexible washer in engagement with said piston rod supported on each of said members, whereby leakage from one chamber to another along said piston rod is prevented, said washers being disposed so as to grip said piston rod with an increased force as the air pressure within the chambers is increased.

5. A shock absorber comprising an elongated casing, a plurality of partition members dividing said casing into compression chambers, a piston rod extending through said members, a piston in each chamber secured to said piston rod, and a flexible washer in engagement with said piston rod supported on each of said members, whereby leakage from one chamber to another along said piston rod is prevented, said washers each having one surface exposed to the compressed fluid within one of said chambers.

6. A shock absorber comprising an elongated casing, a plurality of partition members separating said casing into chambers, each of said members having a flared aperture with its larger end communicating with the compression end of one of said chambers, a piston rod in each of said chambers, and a sealing member supported by each of said partition members adjacent the smaller end of its aperture and projecting thereinto for engagement with said piston rod, the free edge of said sealing member being spaced from the wall of the aperture.

7. A shock absorber comprising a casing divided into a plurality of compression chambers, a piston in each of said chambers, a hollow member connecting said pistons for unitary operation, and passageways above and below each of said pistons in communication with the interior of said member.

8. A shock absorber comprising a casing divided into a plurality of compression chambers, a piston in each of said chambers, a hollow member connecting said pistons for unitary operation, and passageways above and below each of said pistons in communication with the interior of said member, said passageways being of different cross-sectional area.

9. A shock absorber comprising a casing divided into a plurality of compression chambers, a piston in each of said chambers, a hollow member connecting said pistons for unitary operation, and passageways above and below each of said pistons in communication with the interior of said member, the passageway below said piston having a smaller cross-sectional area than the passageway above said piston.

10. A shock absorber comprising a casing divided into a plurality of compression chambers, a piston in each of said chambers, a member having a passageway therethrough and connecting said pistons for unitary operation, ports above and below each of said pistons in communication with said passageway and pressure relief valve means and intake valve means arranged to automatically control air communication of said passageway with the atmosphere.

11. A shock absorber comprising a casing divided into a plurality of compression chambers, a piston in each of said chambers, a member connecting said pistons for unitary operation, said member having a longitudinally extending passage therein, and a by-pass around each of said pistons through said passage.

In testimony whereof I have hereunto subscribed my name at Buffalo, Erie County, New York.

PETER W. KANE.